United States Patent
Tanaka et al.

(10) Patent No.: US 10,443,686 B2
(45) Date of Patent: Oct. 15, 2019

(54) CHAIN AND MANUFACTURING METHOD OF A CHAIN

(71) Applicant: DAIDO KOGYO CO., LTD., Ishikawa (JP)

(72) Inventors: Motoki Tanaka, Ishikawa (JP); Yurie Koami, Ishikawa (JP); Hiroki Nakagawa, Ishikawa (JP); Yuma Osaka, Ishikawa (JP)

(73) Assignee: DAIDO KOGYO CO., LTD., Ishikawa Pref. (JP)

( * ) Notice: Subject to any disclaimer, the term of this patent is extended or adjusted under 35 U.S.C. 154(b) by 237 days.

(21) Appl. No.: 15/642,711

(22) Filed: Jul. 6, 2017

(65) Prior Publication Data

US 2018/0031075 A1 Feb. 1, 2018

(30) Foreign Application Priority Data

Jul. 27, 2016 (JP) ................................. 2016-147881

(51) Int. Cl.
- *F16G 13/06* (2006.01)
- *B21L 9/00* (2006.01)
- *B21L 9/06* (2006.01)

(52) U.S. Cl.
CPC .............. *F16G 13/06* (2013.01); *B21L 9/00* (2013.01); *B21L 9/065* (2013.01)

(58) Field of Classification Search
CPC .......... F16G 13/06; F16G 13/04; F16G 13/08; B29C 66/71; B29K 2059/00
USPC ........................................................ 474/229
See application file for complete search history.

(56) References Cited

U.S. PATENT DOCUMENTS

| | | | | | |
|---|---|---|---|---|---|
| 583,151 | A | * | 5/1897 | Morse | F16G 13/06 474/229 |
| 953,427 | A | * | 3/1910 | Morse | F16G 13/06 474/229 |
| 1,863,606 | A | * | 6/1932 | Perry | F16G 13/06 474/229 |
| 1,945,357 | A | * | 1/1934 | Pierce | F16G 13/10 474/210 |
| 2,568,650 | A | * | 9/1951 | McIntosh | F16G 13/06 474/227 |
| 3,153,348 | A | * | 10/1964 | Kuntzmann | F16G 13/06 474/231 |

(Continued)

FOREIGN PATENT DOCUMENTS

| | | |
|---|---|---|
| JP | 2001-50356 | 2/2001 |
| JP | 2011-17366 | 1/2011 |

*Primary Examiner* — Henry Y Liu

(74) *Attorney, Agent, or Firm* — Wenderoth, Lind & Ponack, L.L.P.

(57) ABSTRACT

A chain includes a plurality of inner links and a plurality of outer links. Each of the inner links includes a pair of inner plates each having a bush hole and a bush. The bush includes both end portions which are press-fitted into bush holes of the pair of the inner plates. Each of the outer links includes a pair of outer plates and a pin. A diametric dimension in a pitch direction of an inner diametric surface of the bush is constant along an entire axial length of the bush. A diametric dimension in a height direction of the inner diametric surface at each of the both end portions of the bush is smaller than a diametric dimension in the height direction of the inner diametric surface at an intermediate part of the bush located between the pair of inner plates.

7 Claims, 12 Drawing Sheets

(56) References Cited

U.S. PATENT DOCUMENTS

| | | | | | |
|---|---|---|---|---|---|
| 3,324,737 | A | * | 6/1967 | Onulak | F16G 13/06 474/230 |
| 3,590,650 | A | * | 7/1971 | Rollins | F16G 13/06 474/229 |
| 4,186,617 | A | * | 2/1980 | Avramidis | F16G 13/06 474/229 |
| 4,729,756 | A | * | 3/1988 | Zimmer | F16G 13/06 474/214 |
| 5,176,587 | A | * | 1/1993 | Mott | F16G 13/06 474/216 |
| 5,382,199 | A | * | 1/1995 | Ducharme | B65G 17/42 474/210 |
| 5,464,374 | A | * | 11/1995 | Mott | F16G 5/18 474/224 |
| 5,667,442 | A | * | 9/1997 | Tanaka | B29C 65/565 464/49 |
| 5,700,217 | A | * | 12/1997 | Wakabayashi | F16G 13/04 474/214 |
| 6,733,410 | B2 | * | 5/2004 | Saito | F16G 13/04 474/201 |
| 7,056,248 | B2 | * | 6/2006 | Butterfield | F16G 13/04 474/212 |
| 7,585,239 | B2 | * | 9/2009 | Miyazawa | F16G 13/06 474/155 |
| 8,057,340 | B2 | * | 11/2011 | Suko | F16G 13/06 474/206 |
| 9,657,810 | B2 | * | 5/2017 | Koschig | F16G 13/04 |

* cited by examiner (H): CROSS-SECTION IN HEIGHT DIRECTION (P): CROSS-SECTION IN PITCH DIRECTION TEST CONDITIONS
- WEAR TESTING MACHINE
- 8 mm PITCH ROLLER CHAIN
- 1000 N
- 1ST/6500 rpm
- DETERIORATION CORRESPONDING OIL

PRIOR ART

CHAIN AND MANUFACTURING METHOD OF A CHAIN

BACKGROUND OF THE INVENTION

Field of the Invention

The present disclosure relates to a chain such as a roller chain and a bush chain and more specifically to a chain having a bush and a manufacturing method of a chain manufactured by press-fitting a bush into a bush hole of an inner plate.

Description of the Related Art

In general, a roller chain includes outer links in which both end portions of a pair of outer plates are linked by pins and inner links in which both end portions of a pair of inner plates are linked by bushes around which rollers are fitted. Then, the roller chain is constructed by alternately linking the outer links with the inner links by fitting the pins into the bushes. While there are a winding bush molded by winding a plate member and a solid bush formed into a seamless monolithic structure molded by cold forging and cutting works, either bush is formed of a cylindrical member having predetermined outer and internal diametric dimensions.

As illustrated in FIG. 12A, the inner plate 1 is provided with circular bush holes 1a at both end portions thereof. A diametric dimension of the bush hole 1a is smaller than an external diametric dimension of a bush 2 by a predetermined amount, and the bush 2 is coupled with the inner plates 1 by being press-fitted into the bush holes 1a of the inner plates 1. When the bush 2 having an equal thickness in an axial direction is press-fitted into the bush hole 1a of the inner plate 1, the bush 2 is deformed such that a press-fitted part thereof protrudes in an inner diametric side and a deformation portion A is formed as illustrated in FIG. 12B. While an inner diametric surface of the bush 2 comes into slidable contact with the pin when the chain bends, the deformation portion A comes into biased contact with the pin and a wear elongation of the chain is accelerated.

There is also a bush $2_2$ whose both end portions of an inner diametric surface is tapered as a taper B as illustrated in FIG. 12C. The bush $2_2$ is configured such that a deformation portion A formed when the bush $2_2$ is press-fitted into the bush hole 1a of the inner plate 1 is formed on the taper B so that the inner diametric surface of the bush $2_2$ becomes closer to flat. However, it is difficult to process the bush such that the depression caused by the taper B is balanced with the protrusion caused by the deformation portion A in high precision, thus the chain costs higher.

Japanese Patent Application Laid-open No. 2001-50356 proposes a bush for a roller chain. In the bush in which tapered depression are formed at both end portions of an inner diametric surface of the bush, the bush is formed such that the depression is located at a point where stress concentrates along a pitch line of the roller chain. That is, the bush is configured such that the depression part deforms, i.e., a diameter thereof contracts, when the bush is press-fitted into the bush hole of the inner plate, and the depression of the both end portions forms an approximately continuous contact surface with respect to the pin together with another inner diametric surface of the bush where no depression is formed.

The tapered depression described in Japanese Patent Application Laid-open No. 2001-50356 described above is formed locally at a position deviating by 180 degrees from a seam of the winding bush by coining or the like before roll molding. Accordingly, as illustrated in FIG. 12C described above, as compared to one in which the tapered depression B is formed around the entire inner circumferential surface at the both end portions of the bush, the abovementioned bush in which the depression is formed locally is readily manufactured. However, the abovementioned bush requires highly precision control, processing and assembling such as control of a thickness of the depression, control of position such as a circumferential direction, and registration in press-fitting the bush into the bush hole of the inner plate. These factors cause an increase of the cost.

Still further, the bush described in the abovementioned Japanese Patent Application Laid-open No. 2001-50356 is configured to allow a material of the bush to move locally toward the depressions at the both end portions of the bush when the bush is press-fitted into the bush hole. Therefore, this configuration suppresses the deformations at the both end portions (whole circumference) of the bush and avoids, reduces or compensates a barrel deformation phenomenon peculiar to the winding bush. Accordingly, this configuration is not applicable to a chain required to have a high wear resistant performance by using the solid type bush for example. In particular, a cumbersome control is supposed to be required at a boundary part between the local tapered depression and the cylindrical inner diametric surface of the bush to keep a continuous smooth connection surface in the state in which the bush is press-fitted, and another problem may be generated due to the local depression. Still further, while the deformation, at the time of press-fitting, of the inner circumferential surface of the bush on a side in which a tension of the chain acts during when the chain is driven normally is uniformed due to the abovementioned local depression, there is the seam of the winding bush and an opening is made along the seam on a side opposite from the abovementioned side by 180 degrees of the inner circumferential surface. Accordingly, the bush has a structure by which the bush cannot be in slidable contact smoothly with the pin. When transmission of the chain is switched between normal and reverse driving conditions, a tension side of the chain is switched to a loose state and a loose side is switch to a tension state. At this time, even if no tension force acts, there is a state in which the pin is in slidable contact with the seam side. Accordingly, in conjunction with cylindrical precision of the bush, it is difficult to apply the roller chain described in the abovementioned Japanese Patent Application Laid-open No. 2001-50356 to a chain which frequently generates reverse driving such as an intra-engine chain.

Lately, a roller chain, in particular used as an intra-engine chain, is provided in a severe environment brought about by an advance of engines such as direct injection type engine as well as by changes of a lubrication state required to reduce fuel consumption. In such environment, the roller chain is required with a higher wear resistant performance.

SUMMARY OF THE INVENTION

According to the first aspect of the present invention, a chain includes a plurality of inner links and a plurality of outer links, and the chain is endlessly composed of the plurality of inner links and the plurality of outer links linked alternately with each other. Each of the inner links includes a pair of inner plates each having a bush hole, and a bush extending in an axial direction. The bush includes both end portions which are press-fitted into bush holes of the pair of the inner plates. Each of the outer links includes a pair of outer plates and a pin linking the pair of outer plates and inserted into the bush. A diametric dimension in a pitch direction of an inner diametric surface of the bush is constant along an entire axial length of the bush. A diametric dimension in a height direction of the inner diametric surface of the bush at each of the both end portions is smaller than a diametric dimension in the height direction of the inner diametric surface of the bush at an intermediate part located between the pair of inner plates.

According to the second aspect of the present invention, a chain includes a plurality of inner links and a plurality of outer links. The chain is endlessly composed of the plurality of inner links and the plurality of outer links linked alternately with each other. Each of the inner links comprising a pair of inner plates each having a bush hole and facing with each other and a bush extending in an axial direction. The bush including both end portions which are press-fitted into bush holes of the pair of the inner plates. A stress acting on an inner diametric surface of the bush in a pitch direction at each of the both side portions being smaller than a stress acting on an inner diametric surface of the bush in a height direction orthogonal to the pitch direction at each of the both side portions. Each of the outer links include a pair of outer plates facing with each other, and pins linking the pair of outer plates and inserted into the bushes.

According to the third aspect of the present invention, a manufacturing method of a chain including a plurality of inner links and a plurality of outer links, the chain being composed endlessly of the plurality of inner links and the plurality of outer links linked alternately with each other and each of the inner links comprising a pair of inner plates each having a bush hole and a bush which is press-fitted into the bush holes of the pair of the inner plates, the manufacturing method of the chain, including a first step of preparing the pair of the inner plates and the bush, and a second step of press-fitting both end portions of the bush prepared in the first step into bush holes of the pair of the inner plates. The inner plate and the bush prepared in the first step meet a relationship of Dbh−Dih>Dbp−Dip, where a diametric dimension in a pitch direction of the bush hole is denoted as Dip, a diametric dimension in a height direction orthogonal to the pitch direction of the bush hole is denoted as Dih, an external diametric dimension in the pitch direction of the bush is denoted as Dbp, and an external diametric dimension in the height direction of the bush is denoted as Dbh.

Further features of the present invention will become apparent from the following description of exemplary embodiments with reference to the attached drawings.

DESCRIPTION OF THE EMBODIMENTS

Figure 1A:
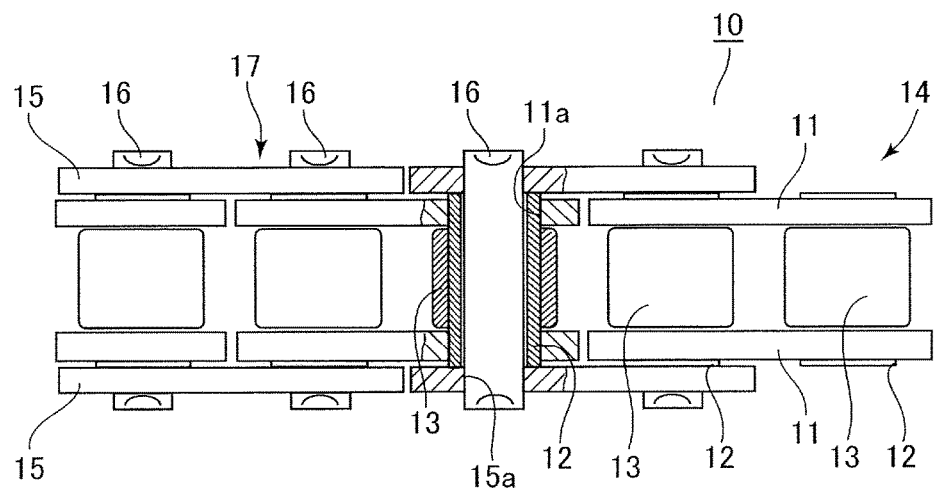
FIG. 1A is a partial section view illustrating a roller chain to which the present disclosure is applicable.

An embodiment of the present disclosure will be described with reference to the drawings. As illustrated in FIG. 1A, a roller chain 10 is composed endlessly of pluralities of inner and outer links 14 and 17 alternately linked with each other. Each of the inner links 14 includes a pair of inner plates 11 facing with each other, bushes 12 respectively connecting both end portions of the inner plates 11, and rollers 13 rotatably and fittingly covering the bushes 12. The outer link 17 includes a pair of outer plates 15 facing with each other and pins 16 respectively linking both end portions of the outer plates 15. The inner and outer links 14 and 17 are linked by the pin 16 fittingly inserted into the bushes 12. The bush 12 of the inner link 14 is press-fitted and fixed into a bush hole 11a defined by the inner plate 11, and the pin 16 of the outer link 17 is fitted into a pin hole 15a of the outer plate 15 and is fixed to the outer plate 15 by caulking an end thereof.

Figure 1B:
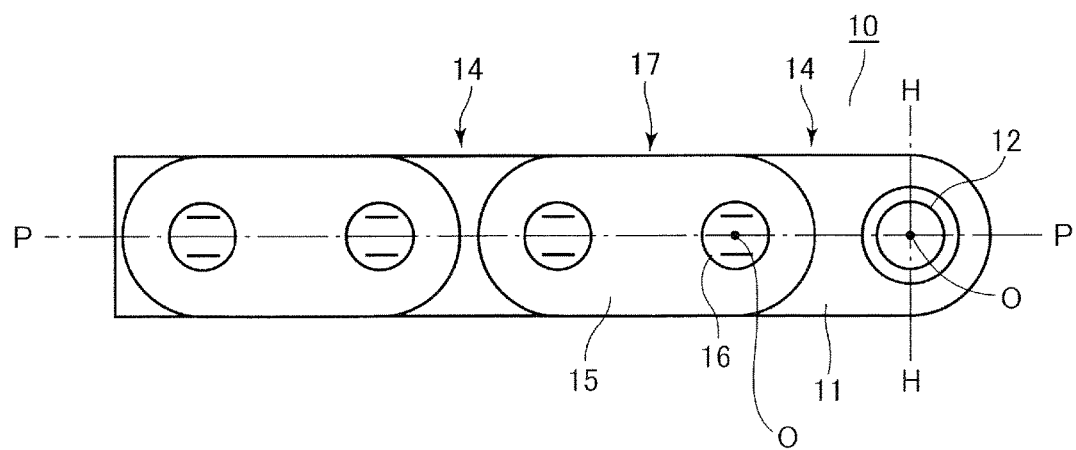
FIG. 1B is a front view illustrating the roller chain.

It is noted that as illustrated in FIG. 1B, a direction in which a tensile force acts when the roller chain 10 transmits driving force, i.e., a direction in which a pitch line P-P connecting centers O of the respective pin holes 15a and bush holes 11a extends, will be defined to be a pitch direction P, and a direction orthogonal to the pitch direction P will be defined to be a height direction H. Still further, a solid bush having a seamless monolithic structure and fabricated by cold forging and/or cutting work is used for the bush 12. The bush 12 has predetermined inner and outer diameters along an entire axial length thereof. That is, the bush 12 is formed into a cylindrical shape having a constant thickness along the entire axial length thereof.

Figure 2A:
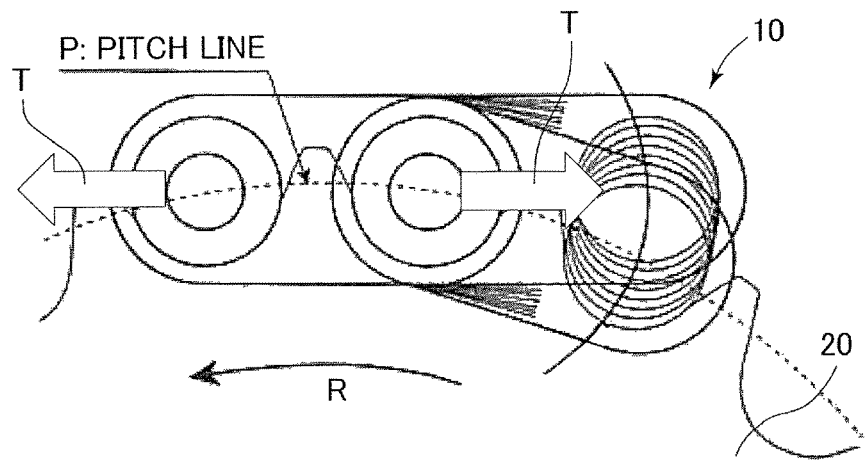
FIG. 2A is a front view illustrating a flection model of the roller chain.
Figure 2B:
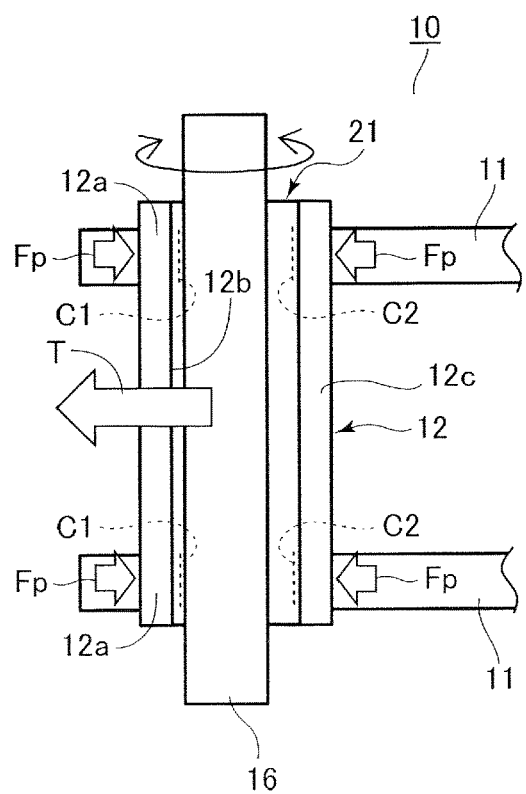
FIG. 2B is a section view illustrating a bent portion of the roller chain.

As illustrated in FIG. 2A, the roller chain 10 transmits rotation R of a sprocket 20 by engaging with the sprocket 20 and a tensile force T-T acts along the pitch line P-P. The roller chain 10 also bends between the inner link 14 and the outer link 17 when the roller chain 10 is wound around the sprocket 20. At this time, as illustrated in FIG. 2B, the bush 12 and the pin 16 slide in contact with each other and rotate relatively, and a bearing portion 21 is formed between the bush 2 and the pin 16.

Figure 4A:
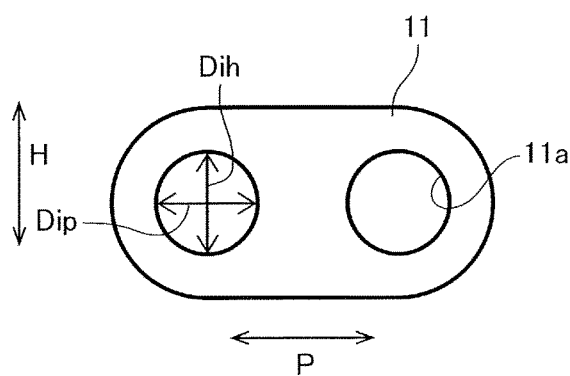
FIG. 4A is a front view illustrating the inner plate before the bush is press-fitted.
Figure 4B:
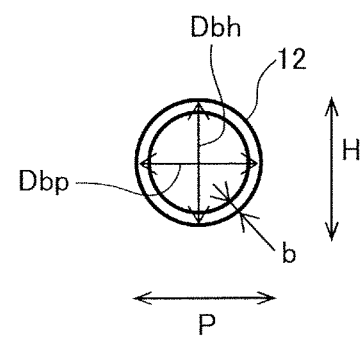
FIG. 4B is a side view illustrating the bush before press-fitted into the inner plate.

As illustrated in FIG. 4A, a dimension of a hole diameter in the pitch direction P of the bush hole 11a of the inner plate 11 in a natural state in which the bush 12 is not press-fitted into the bush hole 11a will be denoted as Dip and a dimension of the bush hole 11a in the height direction H will be denoted as Dih. Still further, as illustrated in FIG. 4B, a dimension of an outer diameter in the pitch direction P of the bush 12 will be denoted as Dbp and a dimension of the outer diameter of the bush 12 in the height direction H will be denoted as Dbh. Then, the inner plate 11 and the bush 12 have the following relationship:

$$Dbh-Dih>Dbp-Dip \qquad \text{Eq. 1}$$

That is, a press-fit margin in the height direction H of the bush 12 press-fitted into the bush hole 11a is larger than that in the pitch direction P. It is noted that the press-fit margin is a dimensional difference between the outer diameter of the bush 12 and the hole diameter of the bush hole 11a. Preferably, the dimensional difference is set to be Dbp−Dip<0.01 mm. That is, the press-fit margin in the pitch direction P is set to be a value smaller than 0.01 mm, i.e., a value including zero or a value extremely near zero. It is noted that the bush 12 is formed so as to have an equal thickness b along an entire axial length thereof. Accordingly, dimension of the inner diameter in the height direction H of the bush 12 is Dbh−2b and dimension of the inner diameter in the pitch direction P is Dbp−2b.

Figure 3A:
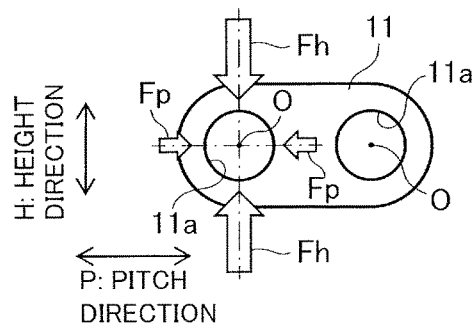
FIG. 3A is a front view illustrating an inner plate of the chain.
Figure 3B:
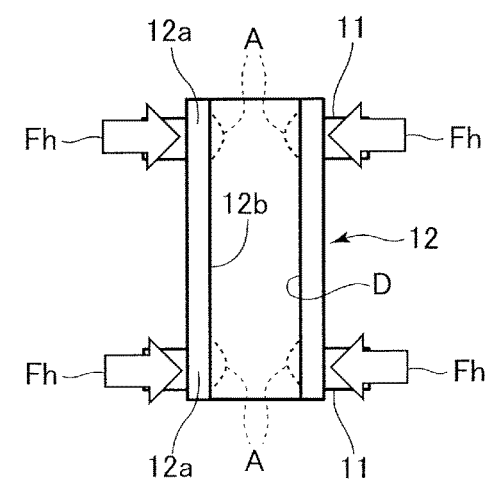
FIG. 3B is a section view illustrating a cross-section in a height direction of a bush.
Figure 3C:
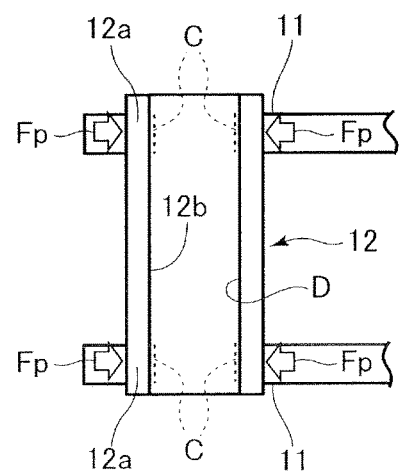
FIG. 3C is a section view illustrating a cross-section in a pitch direction of the bush.

In a case where both end portions of the bush 12 constructed as described above are press-fitted respectively into the bush holes 11a of the inner plate 11, the press-fit margin in the height direction H, i.e., Dbh−Dih, is large, the end portions of the bush 12 in the height direction H deform significantly, and a large stress Fh acts on the bush hole 11a as illustrated in FIG. 3A. Meanwhile, the press-fit margin in the pitch direction P, i.e., Dbp−Dip, is zero or near zero, the end portion of the bush in the pitch direction P deforms less or does not deform, and a stress Fp on the bush hole 11a is zero or is extremely small. Thereby, in the state in which the both end portions 12a of the bush 12 is press-fitted into the bush hole 11a of the inner plate 11, the bush 12 deforms relatively largely as illustrated in FIG. 3B in terms of the cross-section (H) in the height direction, and a deformation portion A protruding to the inner diametric surface 12b side of the bush 12 is generated. The bush 12 barely deforms or deforms very little even if it deforms as illustrated in FIG. 3C in terms of the cross-section (P) in the pitch direction, and the inner diametric surface 12b of the bush 12 including the part corresponding to the bush hole 11a is approximately a flat surface C continues from the inner diametric surface 12b.

Accordingly, the inner diametric surface 12b of the bush 12 has the approximately flat surface that axially continues such that the both end portions 12a press-fitted into the bush hole 11a and an intermediate part 12c (see FIG. 2B) which is located between the pair of inner plates 11 and which receives no influence of press-fitting have an equal diametric dimension in the pitch direction P. In this state, if a difference between the diametric dimension in the pitch direction P of the inner diametric surface 12b at the each of the both end portions 12a and 12a of the bush 12 and the diametric dimension in the pitch direction P of the inner diametric surface 12b at the intermediate part 12c of the bush 12 is 0.01 mm or less, a diametric dimension in a pitch direction P of an inner diametric surface 12b of the bush 12 is considered of being constant along an entire axial length of the bush 12. Still further, the inner diametric surface 12b of the bush 12 at the both end portions 12a which are press-fitted into the bush hole 11a deform in the height direction H and protrude on the inner diametric side. Therefore, the diametric dimension 12b in the height direction H of the inner diametric surface 12b at the both end portions 12a becomes smaller than that of the intermediate part 12c which is not deformed. It is noted that in a scope of the present specification and claims, the term 'press-fitting' does not mean a state in which an outer diameter of the bush 12 is larger than a diameter of the bush hole 11a around a whole circumference thereof. It also includes a state in which the outer diameter of the bush 12 and the diameter of the bush hole 11a are equal or the diameter of the bush hole 11a is slightly larger than the outer diameter of the bush 12. It means that a circumstance in which the bush 12 is coupled with the inner plate 11 by a stress caused by the deformation of the bush 12 and applied to the bush hole 11a as a whole.

In the cross-section (P) of the bush 12 in the pitch direction, the stress Fp acting on the bush hole 11a due to the deformation of the bush 12 is very little or zero, and a coupling force between the bush 12 and the inner plate 11 caused by the press-fitting is small. However, in the cross-section (H) of the bush 12 in the height direction, the stress Fh acting on the bush hole 11a due to the deformation A of the bush 12 is large, and the coupling force between the bush 12 and the inner plate 11 caused by the press-fitting is large. That is, at the both end portions 12a of the bush 12, the stress acting on the inner diametric surface 12b in the pitch direction P is smaller than the stress acting on the inner diametric surface 12b in the height direction H. It is then possible to minimize or zero the deformation of the both end portions 12a of the bush 12 in the cross-section in the pitch direction P and to achieve the coupling force that will not separate the bush 12 from the inner plate 11 by appropriately setting the press-fit margin in the height and pitch directions.

As illustrated in FIGS. 2A and 2B, the roller chain 10 bends in a state in which the tensile force, i.e., a tension, T acts on the roller chain 10 in the pitch direction P. At this time, while the outer circumferential surface of the pin 16 is in slidable contact with the inner diametric surface 12b of the bush 12 at the bearing portion 21, the tensile force T in the pitch direction P acts in a direction in which the inner link 14 and the outer link 17 separate in a longitudinal direction from each other, and the inner diametric surface 12b of the bush 12 is in slidable contact with the pin 16 on an outer side in a longitudinal of the inner plate 11. As illustrated in FIG. 2B, the slidable contact portion is located in a direction of the chain tension T, and a bush press-fit margin is small (including zero) in the pitch direction P as described above. Due to that, the bush 12 deforms less (including zero) in the pitch direction P even at the both end portions 12a press-fitted into the bush hole 11a, and the both end portions 12a and the intermediate part 12c of the inner diametric surface 12b forms a continuous flat surface C1. Thereby, the pin 16 and the bush 12 are in contact with each other in a large contact area along the entire axial direction in a direction of the tensile force T.

For instance, when the roller chain 10 is used as a chain transmitting driving force from an engine such as a drive chain for traveling a motorcycle or an intra-engine chain such as a timing chain, an output of the engine changes depending on a traveling condition or the like, and a reverse driving condition in which driving force is transmitted from a load side to the engine, i.e., an input side, by inertia or the like, frequently occurs. Normally, while the tensile force T acts on the chain on a tension side and no tensile force acts on a loose side, the tension side and the loose side of the chain are switched in the reverse driving condition. When the tension side and the loose side of the chain are switched, there is a case where the pin 16 comes into slidable contact with the inner diametric surface 12b of the bush 12 on an inner side of the inner link in the pitch direction P, i.e., in a direction opposite to the tensile force T illustrated in FIG. 2B even if no chain tensile force acts. Similarly to the outer side of the inner link (C1) described above, the bush 12 deforms less (including zero) at the inner diametric surface 12b of the both end portions 12a also in the pitch direction P of the inner side of the inner link, and a flat surface C2 where the both end portions 12a and the intermediate part 12c of the inner diametric surface 12b are continuous is formed. Due to that, the pin 16 and the bush 12 come into contact at a wide range of area continuous along the entire length of the bush also on the inner side of the inner link.

Accordingly, the inner diametric surface 12b of the bush 12 to which the chain tension acts and which is in slidable contact with the pin 16 of the roller chain 10 is formed approximately of the flat surface which is continued along the entire axial length including the both end portions which are press-fitted into the bush holes. Then, because the pin 16 is in contact with the inner diametric surface 12b in the wide range of area where no local contact is generated, the wear resistant performance is enhanced.

Figure 5:
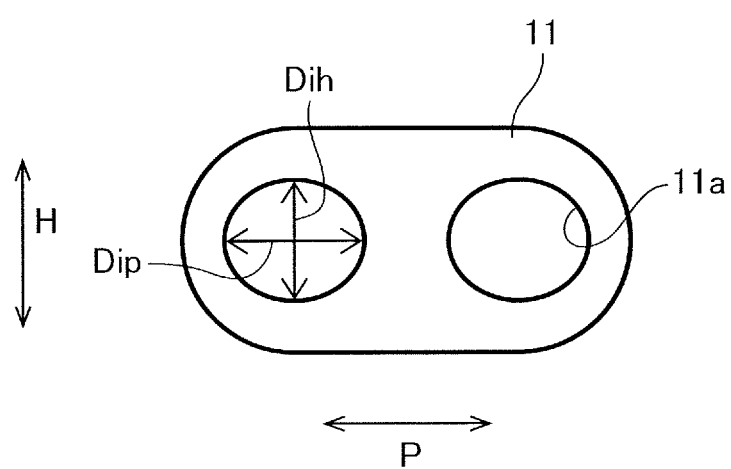
FIG. 5 is a front view illustrating the inner plate before the bush is press-fitted according to a first embodiment.

A first mode which is a specific example meeting the equation 1 described above will be described with reference to FIG. 5. The bush hole 11a of the inner plate of this mode is defined into an elliptical shape in which a pitch direction dimension Dip is longer than a height direction dimension Dih (Dih<Dip). A prior art bush which is right circular and whose external and internal diametric dimensions are approximately equal both in the pitch and height directions P and H is used. Accordingly, with regard the bush having the perfectly circular outer diameter (Dbp=Dbh), the bush hole 11a has a large press-fit margin in the height direction H and a small (including zero) press-fit margin in the pitch direction P. An inner plate 11 and the bush 12 meeting such dimensional relationship are prepared in a first step. Next, the both end portions of the bush 12 are press-fitted into the inner plate 11 having the abovementioned elliptical bush holes 11a. This is a second step. Thereby, as illustrated in FIGS. 3B and 3C, the inner diametric surface at the both end portions 12a of the bush 12 generates the deformation portion A largely in the cross-section (H) and includes the flat surface C formed of a small deformation (including zero) in the cross-section (P).

Figure 6:
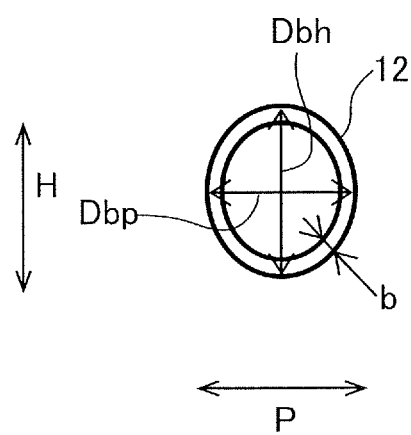
FIG. 6 is a side view illustrating the bush before press-fitted into the inner plate according to a second embodiment.

FIG. 6 illustrates a second mode different from the abovementioned first mode. A cross-section of an outer diameter of the bush 12 of the present mode is formed into an elliptical shape in which a height direction dimension Dbh is longer than a pitch direction dimension Dbp (Dbh>Dbp). A conventional inner plate 11 having a bush hole which is right circular and whose diametric dimensions both in the pitch and height directions P and H are approximately equal is used. Accordingly, with regard the inner plate 11 having the perfectly circular bush hole, the bush 12 has a large press-fit margin in the height direction H and a small (including zero) press-fit margin in the pitch direction P. As illustrated in FIGS. 3B and 3C, the inner diametric surface at the both end portions 12a of the bush 12 generates a deformation portion A largely in the cross-section (H) and includes a flat surface C formed of a small deformation (including zero) in the cross-section (P) by press-fitting the both end portions of the bush 12 into the bush holes 11a of the inner plate 11.

It is noted that in the first and second modes described above, although the part of the bush 12 press-fitted into the bush hole 11a is deformed by press-fitting, an intermediate part of the bush 12 receives no influence of press-fitting and has approximately the same dimension with a natural condition before press-fitting.

Embodiment

Figure 7A:
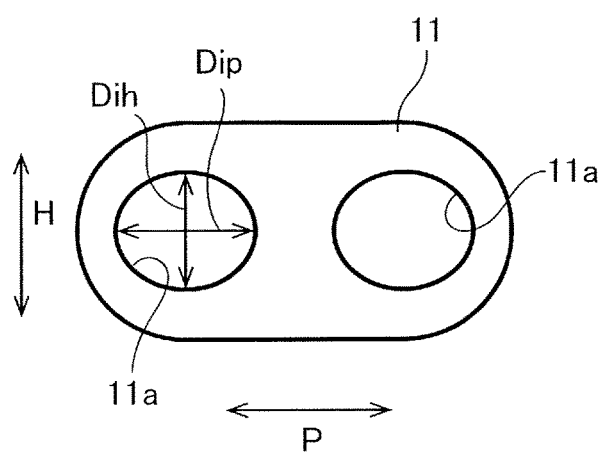
FIG. 7A is a front view illustrating the inner plate according to the first embodiment.
Figure 7B:
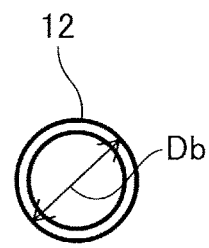
FIG. 7B is a side view illustrating the bush.

An embodiment based on the first mode described above will be described below. As illustrated in FIG. 7A, the bush hole 11a of the inner plate 11 is formed into an elliptical shape in which the height direction dimension Dih is 4.22 mm and the pitch direction dimension Dip is 4.27 mm. As illustrated in FIG. 7B, the bush 12 has a perfectly circular shape whose outer diameter has equal height and pitch direction dimensions. A diametric dimension Db thereof is 4.27 mm. That is, a press-fit margin (Db−Din) in the height direction is 0.05 mm and a press-fit margin (Db−Dip) in the pitch direction is 0.00 mm.

Figure 8A:
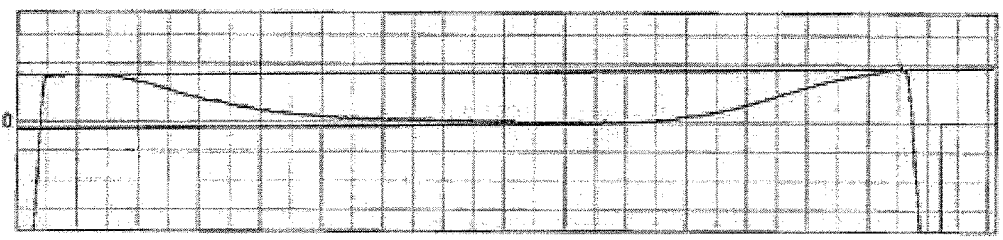
FIG. 8A is an actually measured diagram illustrating a shape of an inner diametric surface of the bush in the height direction.
Figure 8B:
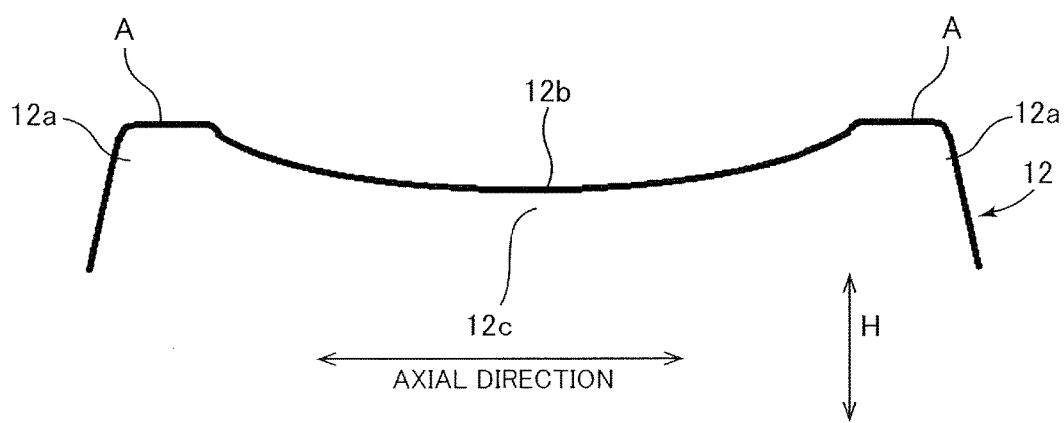
FIG. 8B is a schematic diagram illustrating the bush in FIG. 8A.
Figure 9A:
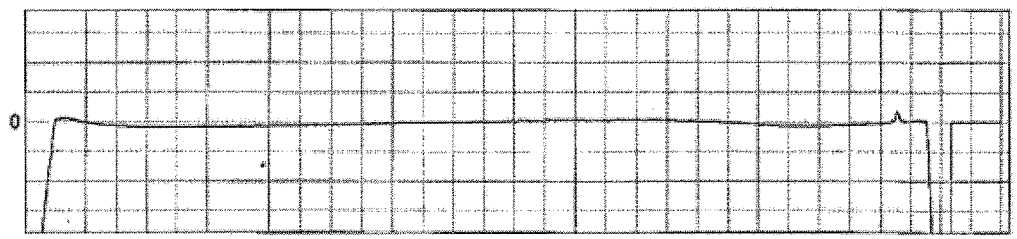
FIG. 9A is an actually measured diagram illustrating a shape of the bush in the pitch direction.
Figure 9B:
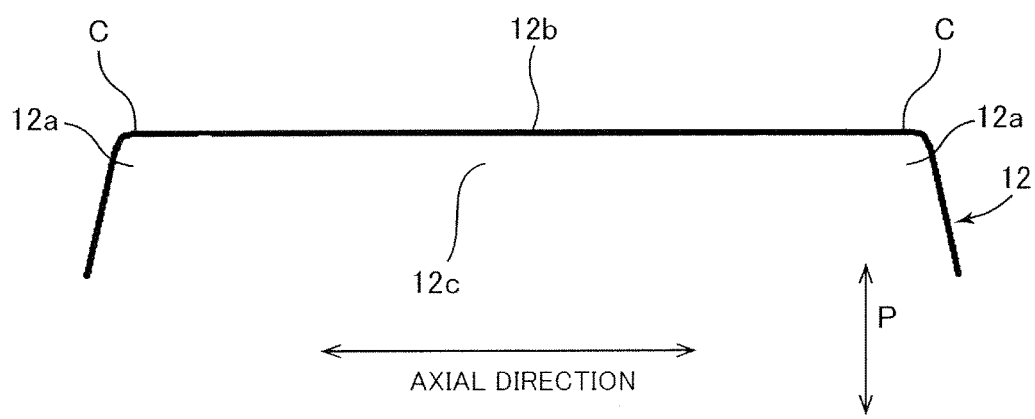
FIG. 9B is a schematic diagram illustrating the bush in FIG. 9A.

A shape of the inner diametric surface 12b of the bush 12 in a state in which the bush 12 is actually press-fitted into the bush hole 11a will be described with reference to FIGS. 8A through 9B. FIG. 8A is an actually measured diagram in which an axis of abscissa represents the axial direction of the bush 12 and an axis of ordinate represents a deformation amount of the inner diametric surface 12b in the pitch direction P and in which zero represents a position before press-fitting. In FIGS. 8A through 9A, the axis of ordinate is magnified with respect to the axis of abscissa by 25 times. FIGS. 8B and 9B are schematic diagrams representing the deformation amounts of the inner diametric surface of the bush 12 obtained by clarifying FIGS. 8A and 9A, respectively. As illustrated in FIGS. 8A and 8B, the inner diametric surface 12b of the bush 12 is deformed in the height direction H such that the both end portions 12a are deformed by the press-fit margin such that the deformation portion A is generated and protrudes to the inner diametric side more than the intermediate part 12c receiving no influence of press-fitting. That is, the inner diametric surface 12b of the bush 12 is formed such that a diametric dimension in the height direction H of the both end portions 12a press-fitted into the bush hole 11a is small as compared to a diametric dimension in the height direction H of the intermediate part 12c. As illustrated in FIGS. 9A and 9B, the inner diametric surface 12b of the bush 12 in the pitch direction P deforms approximately none (even if there is, it is very small) because the press-fit margin is zero. Due to that, the inner diametric surface 12b has the flat surface C. A diametric dimension in the pitch direction P of the both end portions 12a fitted into the bush hole 11a is approximately equal to a diametric dimension in the pitch direction P of the intermediate part 12c, and the inner diametric surface 12b is continuously in flush along the entire axial length of the bush 12.

Figure 10:
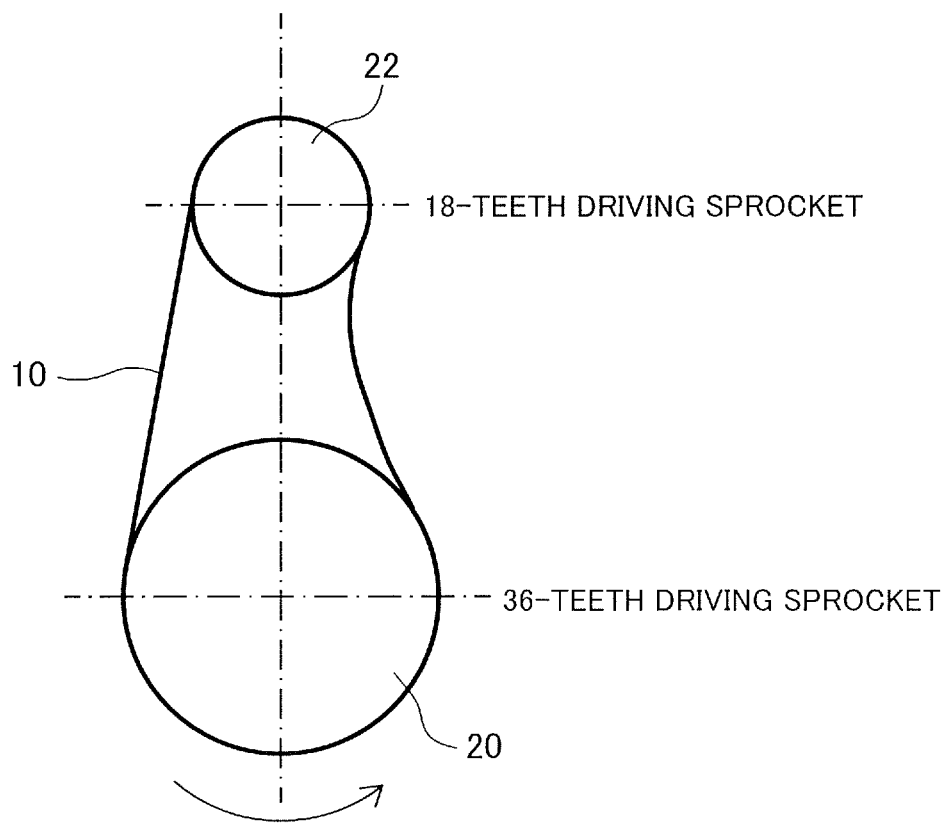
FIG. 10 illustrates a wear resistant elongation test.

FIG. 10 is a diagram representing a chain wear elongation test using the roller chain 10 assembled by linking the inner link 14, in which the both end portions of the bush 12 are press-fitted into the inner plate 11 of the embodiment described above, with the outer link 17. The roller chain 10 of 8 mm in pitch is wound around a 36-teeth driving sprocket 20 and an 18-teeth driven sprocket 22. In this state, a load of 1000 N is applied to the driven sprocket 22, and the sprocket 20 is rotated at 6500 rpm in a deteriorated lubricant oil environment.

Figure 11:
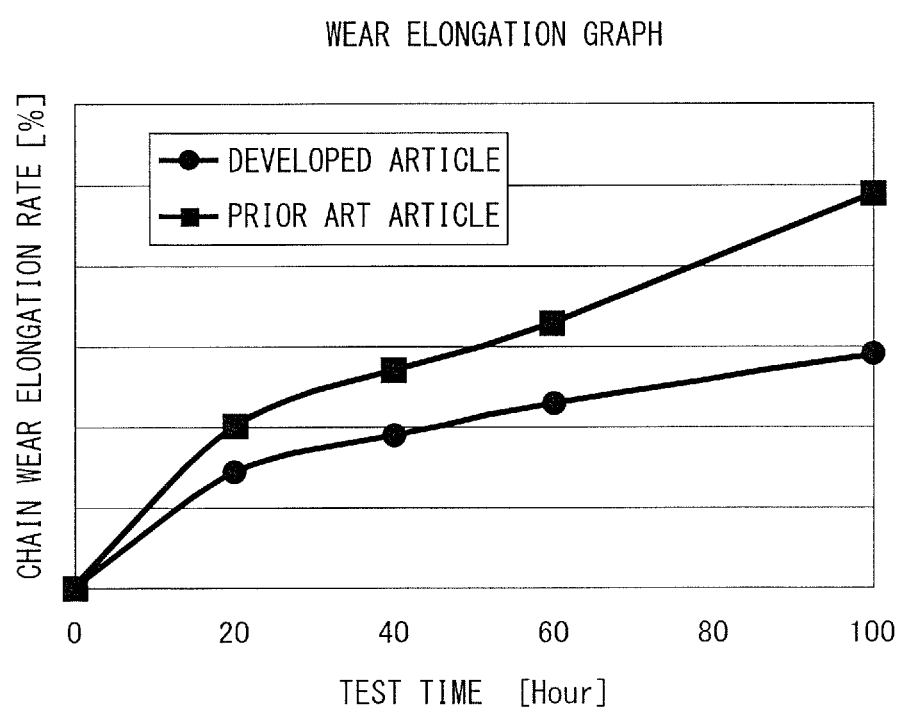
FIG. 11 is a graph illustrating results of the test.
Figure 12A:
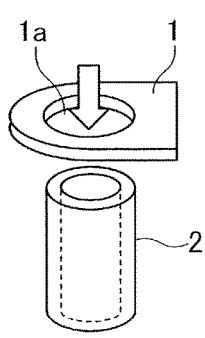
FIG. 12A is an exploded perspective view illustrating an inner plate and a bush according to a prior art technology.
Figure 12B:
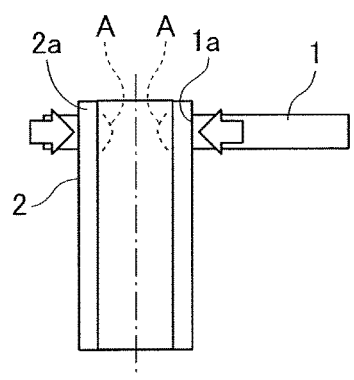
FIG. 12B is a section view illustrating a state in a prior art technology in which the bush is press-fitted into a bush hole of the inner plate.
Figure 12C:
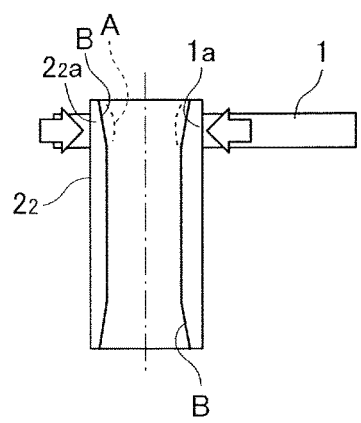
FIG. 12C is a section view illustrating a state in a prior art technology in which a bush whose inner diametric surface end portion is tapered is press-fitted into a bush hole of the inner plate.

FIG. 11 shows results of the test. It is apparent from FIG. 11 that wear elongation of the roller chain (developed article) 10 of the present embodiment is reduced by about 40% as compared to a standard chain (prior art article) manufactured by the prior art press-fitting (see FIG. 12B). Thus, it is possible to assure the wide range of contact area in the pitch direction of the pin with the inner diametric surface of the bush and to improve the wear resistance of the chain by reducing the press-fit margin in the pitch direction P of the bush hole 11a and the bush 12 than the press-fit margin in the height direction H. It is also possible to readily and simply manufacture the chain whose wear resistance is improved while suppressing a manufacturing cost thereof.

It is noted that while the embodiment has been described by exemplifying the roller chain, the present disclosure is not limited to that and is equally applicable also to a bush chain from which rollers are eliminated. Still further, although the embodiment has been described by exemplifying the single row chain, the present disclosure is equally applicable to a multiple row chain in which inner links are multiply disposed in a chain width direction. The present disclosure is also suitably applicable to an intra-engine chain such as a timing chain. However, the present disclosure is not limited to them and is equally applicable also to a travel driving chain such as a chain for a motorcycle. The chain of the present disclosure is equally applicable also to other driving force transmitting chains and conveyor chains. Still further, although the present disclosure is suitable to a chain using a solid bush, it is also applicable to a chain using a winding bush.

Still further, in terms of the shapes of the bush and the bush hole, the present disclosure is not limited to the chain in which one of the bush and the bush hole is perfectly circular and the other is elliptical as long as the press-fit margin in the pitch direction is set to be smaller than the press-fit margin in the height direction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-147881, filed Jul. 27, 2016, which is hereby incorporated by reference wherein in its entirety.

What is claimed is:

1. A chain, comprising:
a plurality of inner links; and
a plurality of outer links, the chain being endlessly composed of the plurality of inner links and the plurality of outer links linked alternately with each other, wherein each of the inner links comprising a pair of inner plates each having a bush hole and facing with each other, and a bush extending in an axial direction, the bush comprising both end portions which are press-fitted into bush holes of the pair of the inner plates,
each of the outer links comprising a pair of outer plates facing with each other and a pin linking the pair of outer plates and inserted into the bush,
a diametric dimension in a pitch direction of an inner diametric surface of the bush is constant along an entire axial length of the bush, and
a diametric dimension in a height direction orthogonal to the pitch direction of the inner diametric surface at each of the both end portions of the bush is smaller than a diametric dimension in the height direction of the inner diametric surface at an intermediate part, of the bush, located between the pair of inner plates.

2. The chain according to claim 1, wherein a difference between the diametric dimension in the pitch direction of the inner diametric surface at the each of the both end portions of the bush and the diametric dimension in the pitch direction of the inner diametric surface at the intermediate part of the bush is 0.01 mm or less.

3. The chain according to claim 1, wherein the bush is a solid bush consisted of a seamless monolithic structure.

4. The chain according to claim 1, wherein the intermediate part of the bush is formed into a right circular shape in which external diametric dimensions in the pitch direction and in the height direction are equal, and
the bush hole of the inner plate is formed into an elliptical shape in which a diametric dimension in the pitch direction is larger than a diametric dimension in the height direction.

5. The chain according to claim 1, wherein the bush hole of the inner plate is formed into a right circular shape in which external diametric dimensions in the pitch direction and in the height direction are equal, and
the intermediate part of the bush is formed into an elliptical shape in which an external diametric dimension in the height direction is larger than an external diametric dimension in the pitch direction.

6. The chain according to claim 1, wherein the bush has an equal thickness along the entire axial length thereof.

7. A chain, comprising:
a plurality of inner links; and
a plurality of outer links, the chain being endlessly composed of the plurality of inner links and the plurality of outer links linked alternately with each other, wherein each of the inner links comprising a pair of inner plates each having a bush hole and facing with each other and a bush extending in an axial direction, the bush comprising both end portions which are press-fitted into bush holes of the pair of the inner plates, a stress acting on an inner diametric surface of the bush in a pitch direction at each of the both side portions being smaller than a stress acting on an inner diametric surface of the bush in a height direction orthogonal to the pitch direction at each of the both side portions, and
each of the outer links comprising a pair of outer plates facing with each other and pins linking the pair of outer plates and inserted into the bushes.

* * * * *